Patented Oct. 28, 1924.

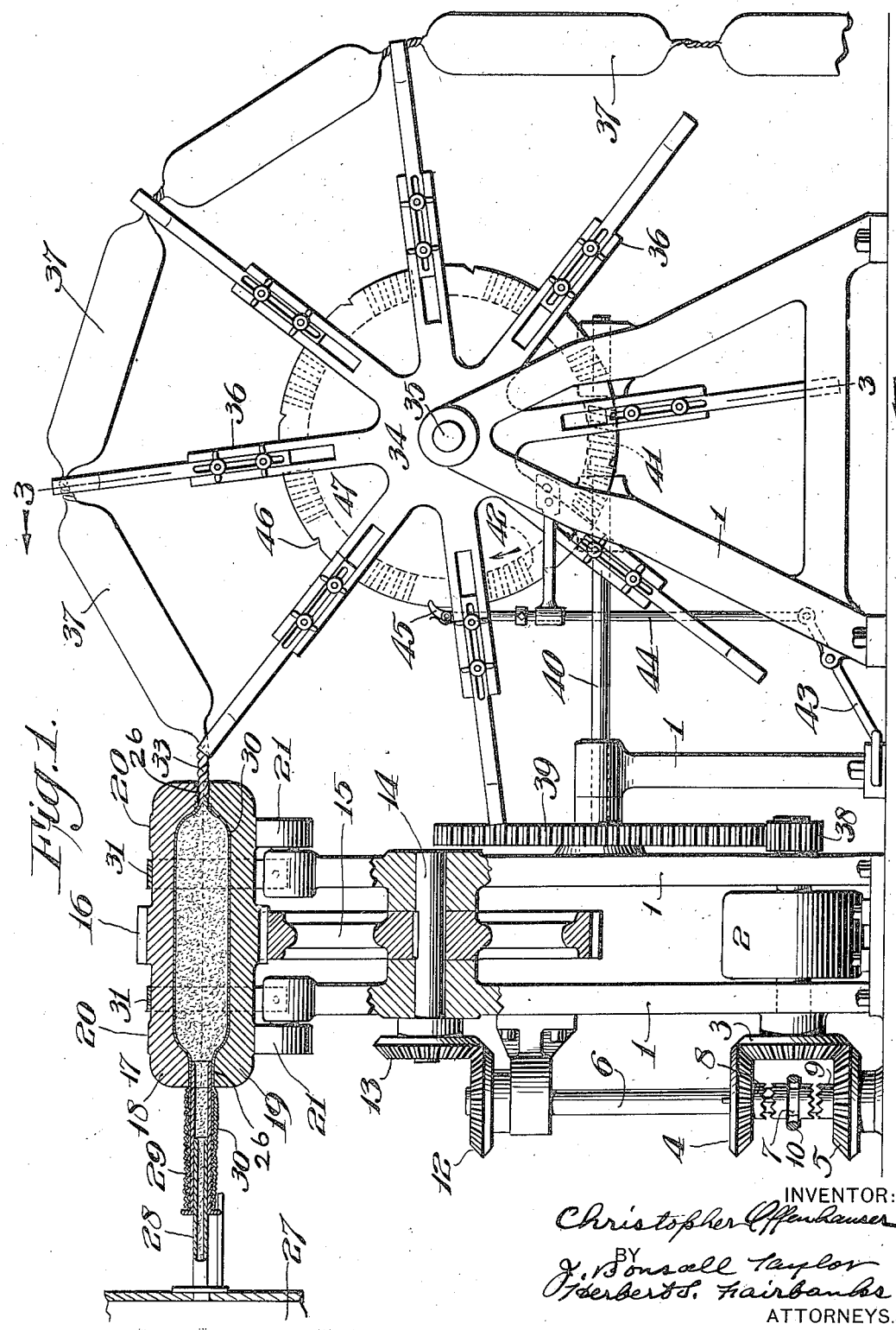

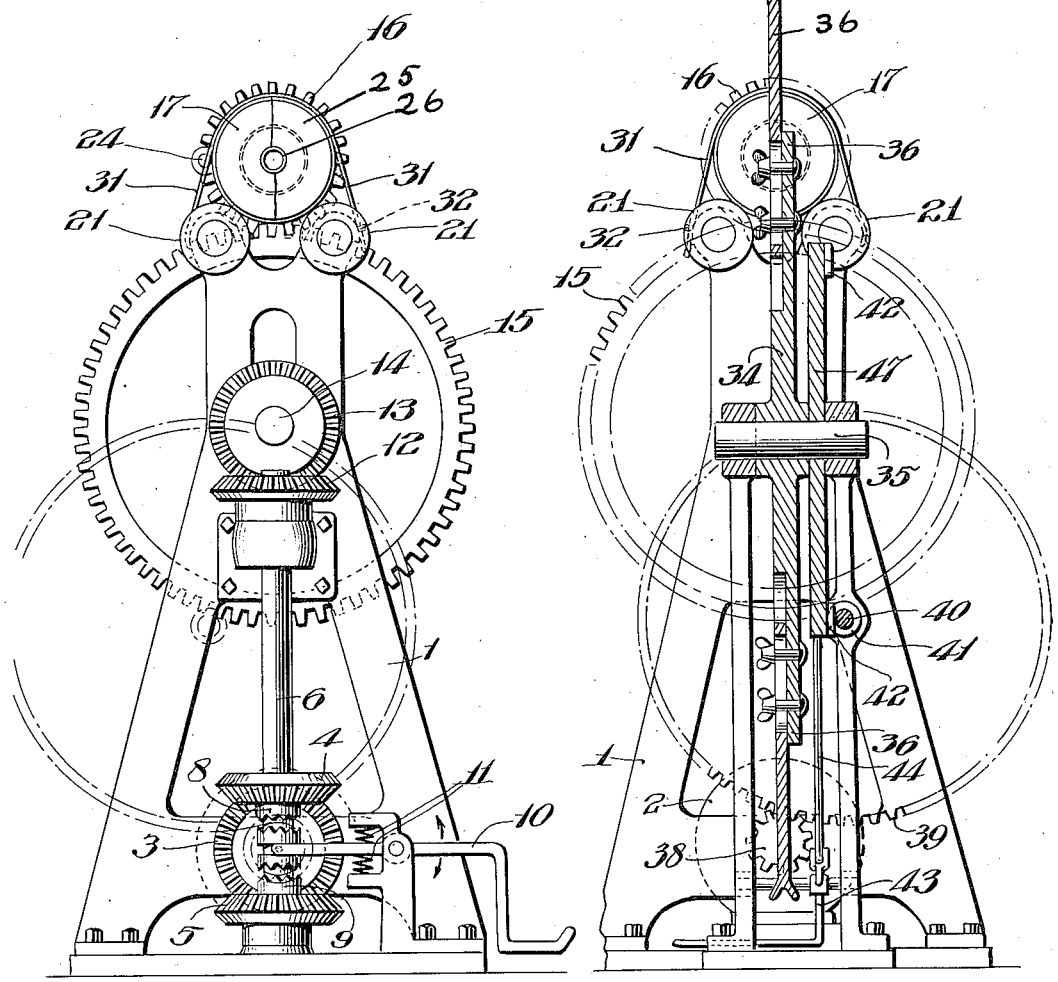

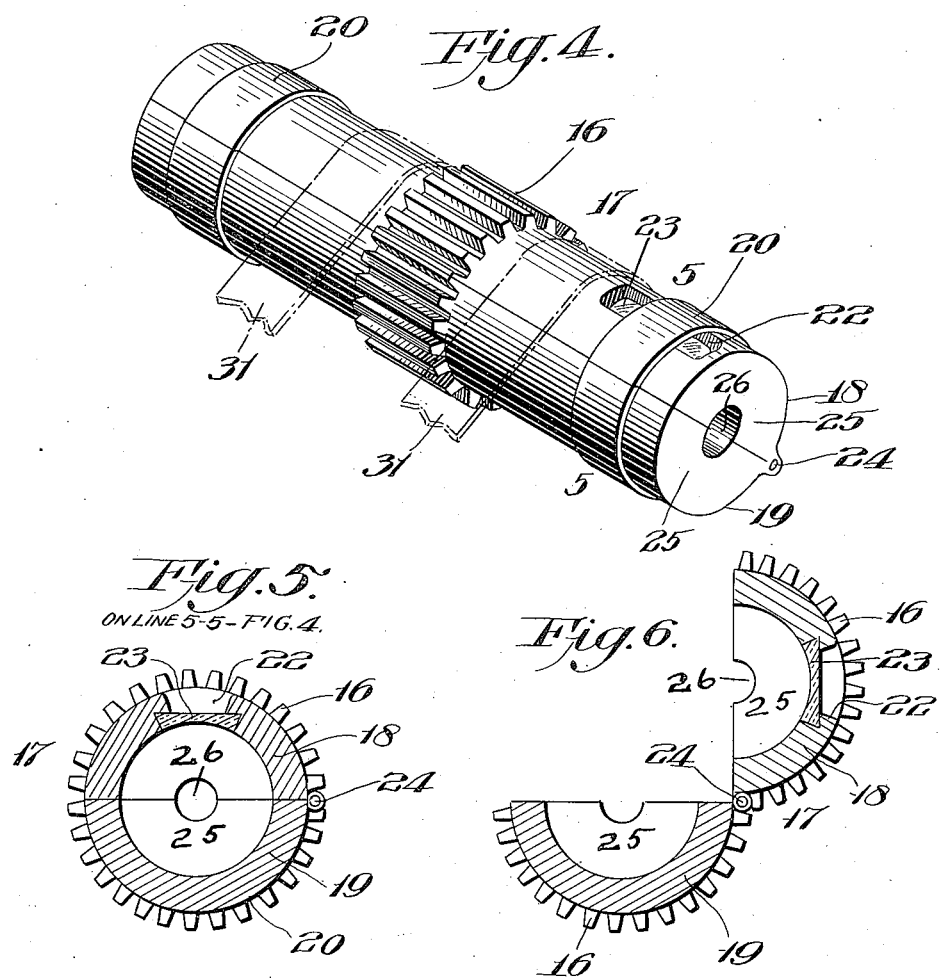

1,513,265

UNITED STATES PATENT OFFICE.

CHRISTOPHER OFFENHAUSER, OF PHILADELPHIA, PENNSYLVANIA.

METHOD OF AND APPARATUS FOR MOLDING AND LINKING SAUSAGES.

Application filed March 24, 1924. Serial No. 701,309.

*To all whom it may concern:*

Be it known that I, CHRISTOPHER OFFENHAUSER, a citizen of the United States, residing at Philadelphia, county of Philadelphia, State of Pennsylvania, have invented a new and useful Method of and Apparatus for Molding and Linking Sausages, of which the following is a specification.

In the manufacture of different kinds of sausage, the sausage meat is forced under pressure into the sausage casings, and, thereafter the casings are linked either by hand or by machine in order to produce links of as nearly as possible a uniform size and weight.

This has heretofore been found impracticable for the reason that the casings, which are obtained mainly from sheep vary considerably in width, and in the devices heretofore employed there was no way to limit the expansion of the casing as the sausage meat from the stuffer passed into it, so that some of the links were long and thin and others were short and thick.

Furthermore, there is at present a very large amount of casings which are not available as they are too large in diameter or vary in diameter at different portions in their length. There is at present therefore, only a limited market for these oversize casings, and they can therefore be purchased very cheaply with consequent economy in the cost of making the sausage links.

One of the objects of my present invention is to devise a novel method of and apparatus for molding and linking sausages in which casings which are not of standard width can be used as well as casing of standard width. Provision is made for limiting to the expansion of the casing as the sausage material is forced into it so that each link will be of uniform size and substantially of uniform weight.

This is very advantageous in practice because the manufacturer can determine how many links will make a pound of sausage, and the number can vary, for example, the molds can be of such construction that ten or more of the sausage links will weigh a pound, if sausages of the Frankforter type are to be made. This also improves the appearance of the links when exposed for sale and they appeal more strongly to the intending purchaser.

My invention further comprehends a novel construction and arrangement of a molding and linking machine adapted to be employed in conjunction with any desired or conventional type of stuffer.

My invention further comprehends, novel molding mechanism, novel linking mechanism, and novel conveyor mechanism for removing the links from the molding mechanism.

It further comprehends a novel construction of replaceable molds so that links of any desired diameter and length can be formed.

Other novel features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is however to be understood that this embodiment is typical only and that the various instrumentalities of which my invention consists can be variously arranged and organized, and that the invention is not limited to the precise arrangement and organization of these instrumentalities as herein set forth.

Figure 1 is a side elevation partly in section of a sausage molding and linking machine, embodying my invention.

Figure 2 is an end elevation of the machine.

Figure 3 is a section on line 3—3 of Figure 1.

Figure 4 is a perspective view of one form of mold which can be employed.

Figure 5 is a section on line 5—5 of Figure 4.

Figure 6 is a section similar to Figure 5 but showing the mold in its open position.

Similar numerals of reference indicate corresponding parts.

Referring to the drawings:—

1 designates the supporting framework of a sausage molding and linking machine, embodying my invention. The construction and arrangement of the framework may vary widely in practice. 2 designates the driving motor, the shaft of which is provided with a gear 3 which is in mesh with the gears 4 and 5 loosely mounted on the shaft 6. A clutch collar 7 keyed to the shaft 6 is adapted to engage with the clutch teeth 8 or 9. 10 designates a clutch lever in the form of a foot treadle which is retained in its neutral or inoperative position by opposed springs 11. The shaft 6 has a gear 12 which meshes with a gear 13 on a shaft 14 journalled in the machine frame. The shaft 14 carries a gear 15 which is adapted to mesh with a gear 16 of a mold 17 which is made in sections 18 and 19 respectively. The mold 17 has the bearing faces or tracks 20 which engage the rollers 21 rotatably mounted on the framework. One of the mold sections is provided with an opening 22 which is covered by a transparent closure 23. The mold sections are hinged together as at 24. The mold sections have the end closures 25 which are recessed to form apertures 26, the aperture at the inlet end being preferably of greater diameter than the aperture at the outlet end.

27 designates a sausage stuffer of any desired or conventional type, and, as the construction and arrangement of such sausage stuffers is well known to those skilled in this art, I have deemed it unnecessary to illustrate and describe in detail the construction and operation of the stuffer. The stuffer is provided with a discharge tube 28 on which is slidably mounted a non-rotatable tube 29 on which the casings 30 are placed.

The weight of the mold may be such that its gear 16 will be retained in mesh with the gear 15, but I preferably employ a pair of straps 31 the rear ends of which are pivoted to fixed portions of the supporting framework 1, and the free ends of the straps form a grasping handle and are adapted to interlock with a fixed portion of the framework as at 32.

At 33 I have shown the linked portion of the sausage. 34 designates a conveyor, the shaft 35 of which is suitably journalled in the framework 1. The hub portion of the conveyor 34 has projecting from it the radial arms 36 which are capable of longitudinal adjustment in order to adapt them to receive links 37 of different lengths. In order to intermittently actuate the conveyor 34 to effect its step by step advance at the proper time, I provide a gear 38 on the shaft of the motor 2, said gear being in mesh with a gear 39 fixed to a shaft 40 which is provided with worm 41 which is adapted to mesh with the worm teeth 42. 43 designates a pedal fulcrumed on the framework 1 and pivotally connected with the link 44 which is provided with a spring pressed pawl 45 which is adapted to be received in the notches or recesses 46 in the periphery of a worm wheel 47 which carries the worm teeth 42.

The operation of my novel sausage molding and linking machine will now be readily apparent to those skilled in this art, and is as follows:

The mold is opened and the sleeve 29 is moved rearwardly and a casing to be stuffed is strung on this sleeve and passed over the lower section of the mold. The top mold section is then closed. The strap 31 is then moved to bring its locking portion 32 into locking position. The operator holds the free end of the casing with one hand and the casing on the tube 29 with his other hand. The operator next actuates the stuffing machine 27, whereupon a predetermined amount of sausage material is forced through the tube 28 and through the tube 29 into the portion of the casing 30 which is within the mold. The casing within the mold expands and is filled with the sausage material as indicated in Figure 1, and this mold limits the outward expansion of the portion of the casing which is within the mold. One link has now been molded within the mold, and the next step is the linking operation. The operator places his foot on the lever 10 to cause the clutch member 7 to move in one direction or the other depending upon the direction in which it is desired to have the linking action take place, that is whether or not the linking is to be accomplished by a right hand or a left hand twisting operation. Assuming for example that the operator presses downwardly with his foot on the foot treadle 10, the clutch member formed by the clutch collar 7 engages the clutch teeth 8 thereby effecting the revolution of the gear 4, the shaft 6 to which it is fixed, the gear 12, the gear 13 and the shaft 14 and the gear 15 which meshes with the gear 16 of the mold to effect the revolution of the latter so that the proper twist is made at 33. The operator then releases the pressure of his foot on the foot treadle 10 and the latter returns to its original position due to the balancing springs 11, and the clutch collar 7 is disengaged. The operator then raises the straps 31 and opens the mold by raising the section 18. The operator then places his foot on the foot pedal 43, thereby causing the pawl 45 to advance the gear wheel 47 sufficiently to bring the gear teeth 42 into mesh with the worm 41, whereupon the gear wheel 47 which is fixed to the conveyor 34 will cause the latter to revolve one step and in so doing remove the molded link from the mold 17. During this operation, the operator grasps the casing on the tube 29 and permits a portion of it to be drawn into the chamber of the mold. The mold is then closed and the straps 31 moved into their locking position. The operation is repeated as before described.

If the operator desires at any time to have the twisting or linking movement take place in a direction opposite to that which has before been described, he raises with his foot the foot treadle 10, thereby causing the clutch collar 7 to interlock with the clutch teeth 9 of the gear 5 which will cause the gear 6 to revolve in a reverse direction to that in which it revolves when driven by the gear 4.

I have preferred to illustrate and describe my invention in connection with a device for molding and linking sausages but it will be apparent that in its broad and generic scope it can be applied for filling casings within a mold with any desired material so that a series of links of substantial uniform dimension and of substantial uniform weight can be formed, and it is therefore to be understood that such use is within the broad and generic scope of this invention.

It will now be apparent that I have devised a new and useful method of and apparatus for molding and linking sausages which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. The method of filling casings, which consists in progressively advancing a casing through a mold, feeding material into the portion of the casing contained within the mold and utilizing the mold to limit the expansion of the casing and thereby form from a single casing a plurality of successive and connected molded links.

2. The method of filling casings, which consists in intermittently advancing a casing through a mold, intermittently feeding material into the portion of the casing contained within the mold and utilizing the mold to limit the expansion of the casing and thereby form from a single casing successive and connected molded links.

3. The method of filling casings, which consists in placing a casing within a mold, feeding material into the portion of the casing contained within the mold, twisting the casing to form a link, opening the mold, removing the molded link and at the same time positioning the unfilled portion of the casing posterior to the molded link in the mold, closing the mold, and then repeating the cycle of operations.

4. The method of molding sausages which consists in forcing the sausage material into a casing to expand it, molding the casing by limiting its expansion during the feeding operation, and linking the molded sausage while its expansion is so limited.

5. The method of molding sausage, which consists in feeding the sausage material under pressure into a portion of a casing within a mold to thereby limit the expansion of the casing, rotating the mold to effect the linking operation, and removing the molded sausage link from the mold.

6. In a sausage molder and linker sausage feeding means, sausage molding mechanism to limit the expansion of the casings during the feeding operation, and means to link the casings.

7. In a sausage molder and linker stuffing mechanism, a casing support, sausage molding mechanism to receive the casing and to limit its expansion during the stuffing operation, and means to effect the linking of the casing by relative movement of said support and molding mechanism.

8. In a sausage molder and linker, a casing support, a rotatable sectional mold through which a casing passes, means to feed material into said casing, means to effect the removal of the molded links from said mold.

9. In a sausage molder and linker, a tubular support for the casing, a sectional mold rotatably mounted, a gear intermeshing with said casing, means to revolve said gear, means to feed material into said casing, conveyor mechanism, and means to effect the intermittent advance of said conveyor mechanism.

10. The herein described new article of manufacture comprising a sectional mold having apertures at its ends and provided with an exteriorly driven portion.

11. The herein described mold formed of hinged sections with closures at the ends which contribute to form apertures, said sections having on their periphery annular bearing portions, and said sections carrying a gear.

12. The herein described sausage mold comprising a plurality of sections hinged together and having an aperture at each end, and having a portion of the wall of one section transparent.

13. In a sausage molder and linker, a sectional mold having an aperture at each end, a casing support adapted to pass into one of said apertures, said casing passing through said mold, means to feed the sausage material into the casing within said mold, and means to remove the filled casing from said mold.

14. In a sausage molder and linker, a sectional mold rotatably mounted and provided with a gear, a second gear meshing with the mold gear, means to secure said mold in its closed position, means to feed sausage material into a casing within said mold, and means to drive said second gear.

15. In a molder and linker, a casing support, a molding mechanism to receive and limit the expansion of the casing, means to feed material into the portion of the casing contained within the mold, means to effect relative movement of said support and molding mechanism to link the casing, a conveyor to remove the molded link from said molding mechanism, and means for occasioning the cyclical operations of said molding mechanism, feeding means, linking means and conveyor.

16. In a molder and linker, a casing support, a sectional mold to receive and limit the expansion of said casing, means to intermittently feed material into the casing within the mold, means to link the casing by relative movement of the casing and mold, a conveyor having members to engage the molded links, and actuating means for said conveyor.

17. In a molder and linker, a casing support, a sectional mold to receive and limit the expansion of said casing, means to intermittently feed material into the casing within the mold, means to link the casing by relative movement of the casing and mold, a conveyor having members to engage the molded links, means to adjust said members to receive links of different lengths, and actuating means for said conveyor.

CHRISTOPHER OFFENHAUSER.